(12) United States Patent
Kravtsov

(10) Patent No.: US 7,215,705 B2
(45) Date of Patent: May 8, 2007

(54) REDUCING PHASE NOISE IN PHASE-ENCODED COMMUNICATIONS SIGNALS

(75) Inventor: Vladimir Kravtsov, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 799 days.

(21) Appl. No.: 10/390,525

(22) Filed: Mar. 17, 2003

(65) Prior Publication Data
US 2004/0184522 A1 Sep. 23, 2004

(51) Int. Cl.
H03H 7/30 (2006.01)
H03H 7/40 (2006.01)
H03K 5/159 (2006.01)

(52) U.S. Cl. .................. 375/233; 375/346; 375/232

(58) Field of Classification Search ............. 375/233, 375/346, 232
See application file for complete search history.

(56) References Cited

U.S. PATENT DOCUMENTS 5,796,842 A * 8/1998 Hanna ..................... 381/4
6,034,986 A 3/2000 Yellin ..................... 375/200
7,054,296 B1 * 5/2006 Sorrells et al. ........... 370/338
2001/0026584 A1 10/2001 Sommer et al.
2003/0206073 A1 * 11/2003 Kravtsov ................. 332/103

FOREIGN PATENT DOCUMENTS

| EP | 0 451 289 | 10/1991 |
| EP | 0 750 408 | 12/1996 |
| EP | 1 003 312 | 5/2000 |
| JP | 07240709 A * | 9/1995 |

* cited by examiner

Primary Examiner—David C. Payne
Assistant Examiner—Jia Lu
(74) Attorney, Agent, or Firm—Trop, Pruner & Hu, P.C.

(57) ABSTRACT

A receiver may reduce phase noise in phase-encoded communications signals using symmetrical averaging to estimate phase shift correction. In one embodiment, a receiver, such as a quadrature amplitude modulation receiver may include a decision feedback equalizer and a filter of low complexity to receive a phase modulated incoming signal. Using a combination of phase shift difference estimates prior and subsequent to a decision point for the received symbols, the filter may derive another estimate of the phase shift relative to the estimated phase shift by the equalizer.

13 Claims, 4 Drawing Sheets ns are used to correct for intersymbol
REDUCING PHASE NOISE IN PHASE-ENCODED COMMUNICATIONS SIGNALS

BACKGROUND

This invention relates generally to receivers, and more particularly to receivers that receive modulated signals in phase-encoded communications.

Decision Feedback Equalization (DFE) is a technique for quadrature amplitude modulation (QAM) receivers. In DFE receivers, two sectio interference and gain/phase rotation variations: a feedforward equalizer section which does a linear weighted average of time samples (convolution) to adjust for intersymbol interference caused by following symbols and a feedback equalizer section which adjusts the output of the feedforward equalizer section to remove intersymbol interference from the present estimate caused by previously detected symbols. The feedback equalization section is nonlinear because it contains previously detected symbols.

Commonly a phase shift difference occurs between the phase of a received symbol and a true phase of the current symbol, causing phase noise in an incoming signal of symbols at a receiver. Often this phase shift difference results from instability in the transmitter and/or receiver oscillators and by the Doppler effect. The phase noise has a cumulative effect that shows up as an increasing difference between symbol rotations, if delays between symbols are increasing.

Phase noise may be corrected implicitly by phase-locked loop (PLL) demodulation. For every symbol, an estimation of the current phase shift is generated, based on an average of the phase difference between previously received symbols ("soft decisions") and corresponding hard decisions.

Thus, there is a continuing need for better ways to reduce phase noise in phase encoded communications signals.

DETAILED DESCRIPTION

The phase corrections generated by the classic prior art techniques may be used as a first approximation to a process that generates an improved phase correction in some embodiments. In this embodiment, a history of the phase difference derived from the prior art techniques is stored, such as in a first-in and first-out order. A new phase correction for each symbol may be derived by symmetrically averaging the stored phase differences both before and after a decision point symbol. This new phase correction may be used to generate new values for the hard and soft decisions sent to the decoder. In some embodiments, the phase noise may be reduced, as the same number of averaged symbols are now located twice as close to a decision point for the received symbols in an incoming signal. The decision point may be the middle of the first-in and first-out order in which the history of the phase differences is stored for the received symbols. Embodiments may be used in QAM, phase shift keying (PSK), or any other modulation format in which phase noise is a problem.

Figure 1:
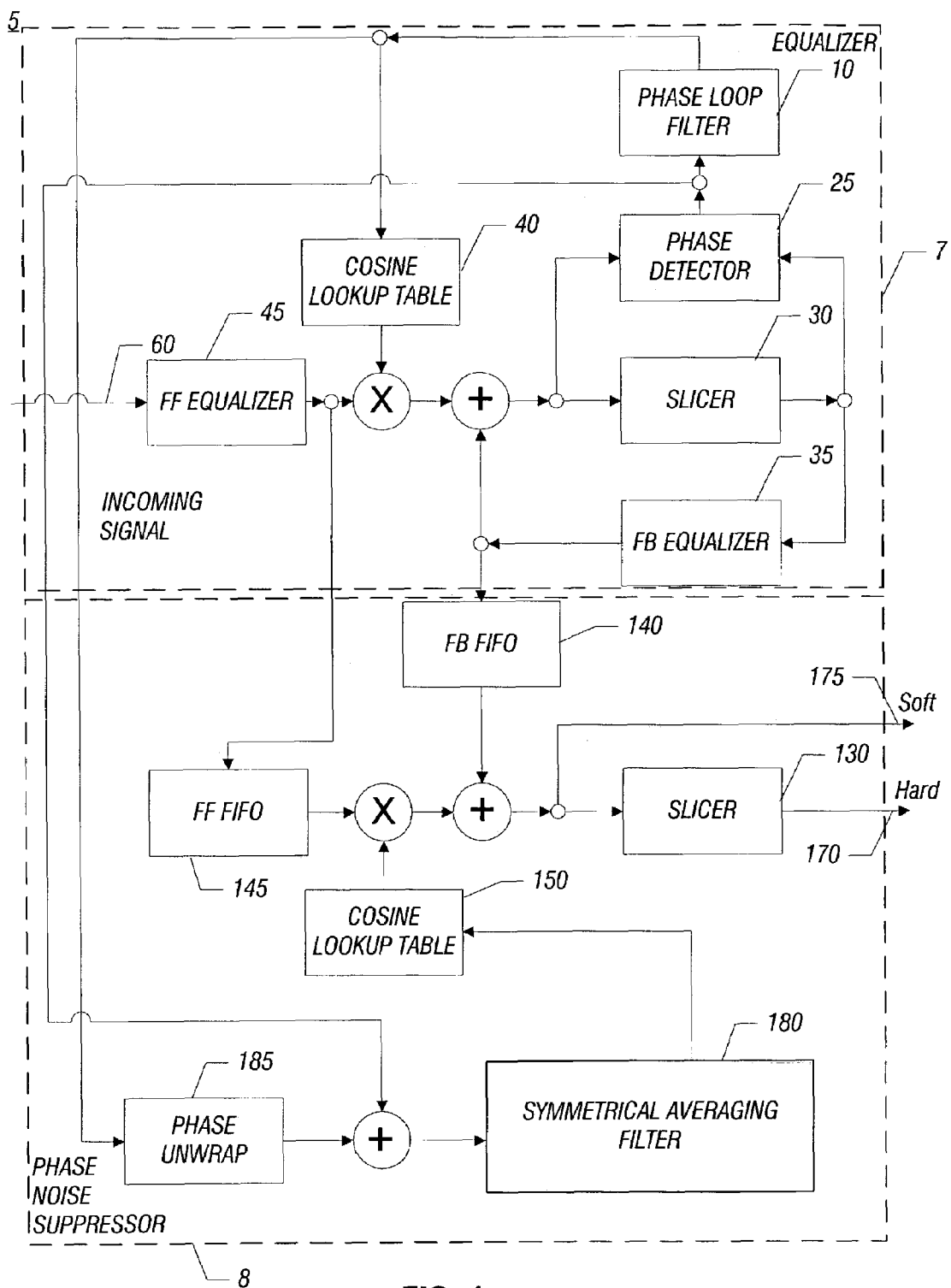
FIG. 1 is a diagram illustrating a process for receiving and decision feedback filtering of a communications signal at a receiver according to an embodiment of the invention.

Referring to FIG. 1, a receiver 5 for receiving signals with phase-encoding is illustrated. The receiver 5 may comprise an equalizer 7 coupled to a phase noise suppressor 8 in many embodiments of the present invention. The receiver 5 may correct for intersymbol interference and gain/phase rotation variations in a communications signal with phase-encoding of symbols. While the equalizer 7 may reduce the phase noise effects by estimating a first phase shift for a correction, the phase noise suppressor 8 may use a combination of phase shift difference estimates prior and subsequent to a decision point to derive another estimate of the phase shift relative to the first phase shift to provide an improved correction.

Intersymbol interference (ISI) and phase error may be approximately removed from an incoming signal 60 in the receiver 5 by feedforward (FF) and feedback (FB) equalizer filters 45 and 35, a slicer 30, a phase detector 25, a phase loop filter 10, and a cosine look-up table 40 holding "exp (iΦ)," a rotation factor for the phase shift. The phase detector 25 detects a difference between the phase of a hard decision signal derived after phase adjustment by the feedforward equalizer filter 45, the cosine lookup table 40 and the feedback equalizer filter 35 and a soft decision signal from the slicer 30. The difference is used by the phase loop filter 10 to generate a phase shift estimation angle. The output of the feedforward equalizer filter 45 is adjusted with the phase shift estimation by multiplying it by a rotation factor generated by the cosine look-up table 40. The outputs of the feedforward and feedback equalizer filters 45 and 35 are stored in respective first-in-first-out (FIFO) buffers 145 and 140.

The phase-adjusted feedforward equalization signal may then be adjusted by summing with a signal from the feedback equalizer filter 35. The inputs of the feedback equalizer filter 35 are decisions from the slicer 30. The decisions may be "noiseless," except for decision errors, in the sense that they may contain no additive noise from communications channels or electronics. The feedforward equalizer filter 45 removes precursor intersymbol interference and the feedback equalizer filter 35 cancels the postcursor intersymbol interference.

The estimation of the current symbol's phase shift may be based upon the phase differences between the past received symbols and past decisions. Those phase differences contain two undesirable stochastic components. The first one is the difference between current symbol phase shift and previous phase shifts. The second one is an error caused by additive noise. In order to suppress the second component, the receiver 5 may average more symbols from the past, but in doing so it enlarges an impact of the first component, as a symbol having bigger delay from current one has also bigger phase shift difference.

The output of the feedforward FIFO buffer 145 may be adjusted by a new phase shift estimation by multiplying it by a correspondingly adjusted correction signal generated by a cosine lookup table 150, providing a rotation factor "exp (−iΦ)" for the phase shift. Although the output of the slicer 130 represents a hard decision 170, both the soft and hard decisions 175, 170 may be used by a decoder according to known forward error correction techniques in some embodiments of the present invention.

The phase shift estimation is derived from a symmetrical average of phase differences stored in a symmetrical averaging filter 180. The symmetrical averaging filter 180 in one embodiment may be a recursive filter, having finite impulse response (N−1) taps with coefficient 1, one tap with coefficient 2, and N−1 taps with coefficient 1. This average may take multiple forms, but in an illustrative embodiment, it is given by:

$$\left(\sum_{d=1}^{N-1} Pdiff_{t-d} + 2 \cdot Pdiff_t + \sum_{d=1}^{N-1} Pdiff_{t+d}\right) / 2N$$

where $Pdiff_t$ is the tth phase difference stored in the filter 180. The phase differences are the sum of the output of the phase detector 25, which is the angle between the soft and hard decisions in the equalizer 7, and the output of the phase loop filter 10 (which is the phase shift estimation by the equalizer 7), that is derived from a phase unwrap 185.

The average formula set forth above involves normalization by 2N. In order to average data, the weighted sum of data may be divided over the sum of weight coefficients. For C being the sum of weight coefficients, wherein weight coefficients are assumed integer numbers with Greatest Common Divisor=1, and the data are phase samples having 2p ambiguity, after division over C, the resulting ambiguity would be 2p/C. In this manner, unwrapping the phase to C×2p=2N×2p.

To this end, the phase ambiguity may be changed to C*2 before average ("phase-un-wrapping"). As a result, the ambiguity will be 2p. Although both phase-un-wrapping and division operations are much easier with $C=2^k$, an optimal symmetrical filter has odd length and equal coefficients. For this optimal filter, $C=2^k$ is ideally not possible (C is an odd number). Accordingly, in order to make C even, the central coefficient of optimal filter is doubled. Using $N=2^{(k-1)}$, $C=2N=2^k$ may be obtained, providing a new filter which is sub-optimal, however, close to an optimal one. In this example, while the phase is un-wrapped before deriving the average, the central tap coefficient is doubled.

In operation, a history of the phase differences for the received symbols in the incoming signal 60 including the phase differences before and after the decision point may be stored in order, such as in first-in and first-out order. The phase of a received symbol in the incoming signal 60 may be detected to derive a phase difference between the phase of the received symbol and a true phase of the current symbol. The filter 180 may symmetrically average the stored phase differences both before and after a symbol in the incoming signal 60 at the decision point. In one embodiment, a symbol may be located for the decision point at the middle of the first-in and first-out order. A new estimate of the phase shift may be obtained by symmetrically estimating the phase shift for the symbol based on an average of the phase differences stored before the decision point and an average of the phase differences stored after the decision point. This new estimate of the phase shift may be used to correct for intersymbol interference and gain/phase rotation variations in the true phase of the current symbol.

By adjusting an average of the phase difference between previously received symbols based on the corrected true phase of the current symbol, a first decision value (soft decision 175) may be generated to demodulate the incoming signal 60 in some embodiments. Using the slicer 130, a second decision value (hard decision 170) may be determined corresponding to the first decision value, while reducing the phase noise.

Figure 2:
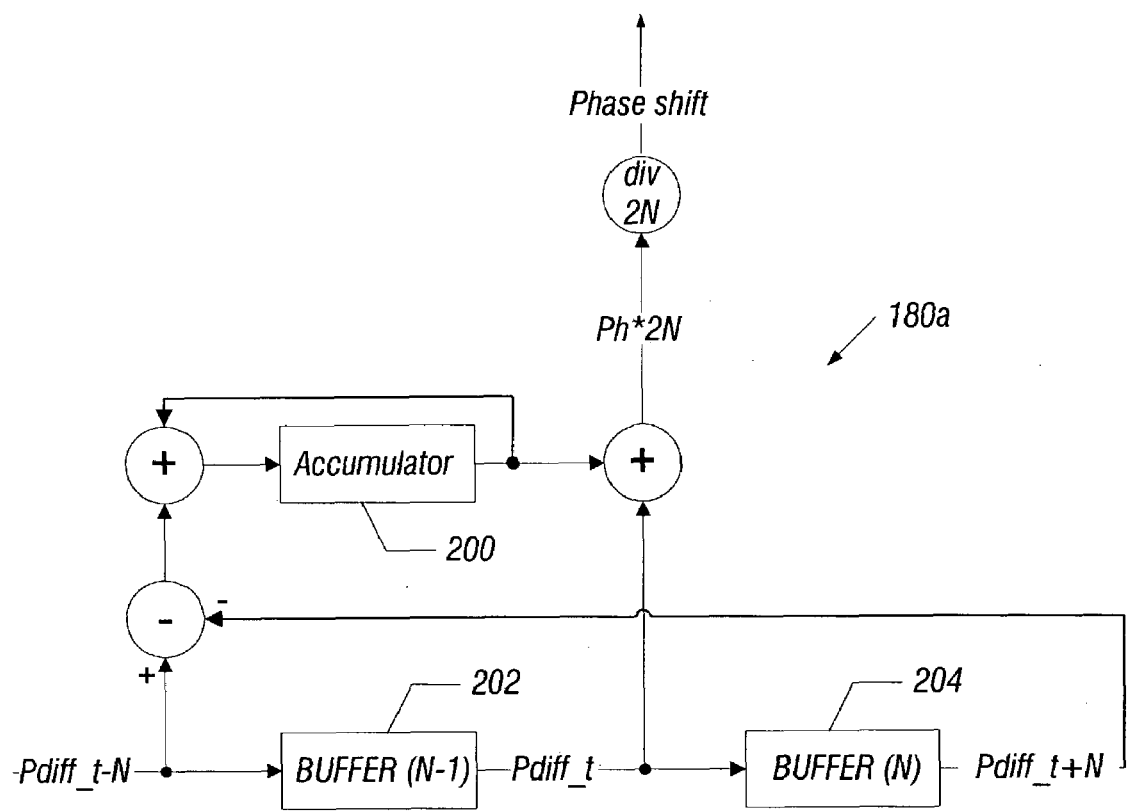
FIG. 2 is a schematic depiction of one embodiment of a symmetrical averaging filter of low complexity useful in the receiver of FIG. 1.

A low complexity filter 180a shown in FIG. 2 may include an accumulator 200 and a buffer pair 202, 204 for symmetrically averaging stored phase differences both before and after a symbol at a decision point in one embodiment of the present invention. In a phase-encoded communications signal, the filter 180a may estimate a phase shift correction, reducing phase noise. The phase shift estimation may be derived from a symmetrical average of phase differences stored in the buffers 202 and 204. The buffer 202 may be a first-in and first-out buffer having length of N−1 to store N−1 taps with coefficient 1. The buffer 202 may store the phase differences before the decision point in some embodiments. Likewise, buffer 204 may store one tap with coefficient 2 and N−1 taps with coefficient 1 in a first-in and first-out buffer, storing the phase differences after a decision point. By using the accumulator 200, with the buffers 202 and 204, the filter 180a may, accordingly, provide a recursive filtering.

Figure 3:
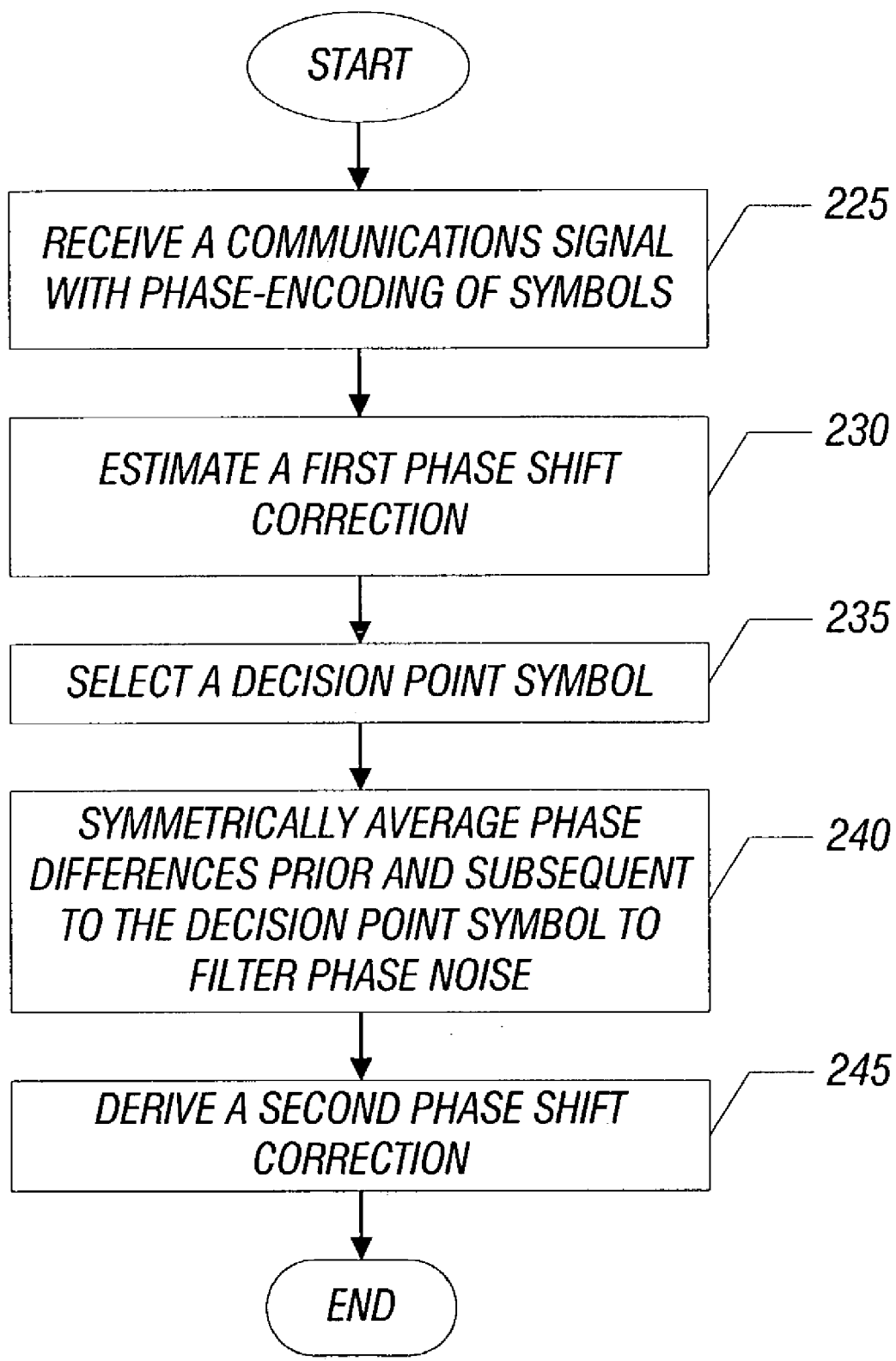
FIG. 3 is a hypothetical flow chart for reducing phase noise in a communications signal using symmetrical averaging to estimate phase-shift correction in accordance with one embodiment of the present invention.

Referring to FIG. 3, a flow chart of phase noise suppression in a phase-encoded communications signal reception is shown using symmetrical averaging that reestimates a phase shift correction relative to a first phase shift estimate. At block 225, the receiver 5 shown in FIG. 1 may receive a communications signal (the incoming signal 60 of FIG. 1) with phase-encoding of symbols, such as used in quadrature amplitude modulation as one example. Using the equalizer 7 shown in FIG. 1, a first phase shift correction estimate may be derived at block 230, as indicated above.

A decision point symbol may be selected at block 235, for example, by locating a symbol for the decision point at the middle of the first-in and first-out buffers 202 and 204. The filter 180a shown in FIG. 2 may symmetrically average phase differences prior and subsequent to the decision point symbol, filtering or substantially reducing phase noise, as indicated by block 240. A second phase shift correction may be derived at block 245, relative to the first phase shift correction of the block 230, using a combination of the phase shift difference estimates obtained at the block 240 in some embodiments of the present invention.

In this manner, by estimating and averaging the phase noise before and after the reception time in order to compensate for the phase noise, a significant improvement in phase noise suppression may be obtained. For example, when receiving quadrature amplitude modulation/phase shift keying modulated signals, at a cable modulator demodulator (modem) or similar broadband equipment, relatively inexpensive tuners may be used in the cable modem without effecting the modem's performance in one embodiment of the present invention.

Figure 4:
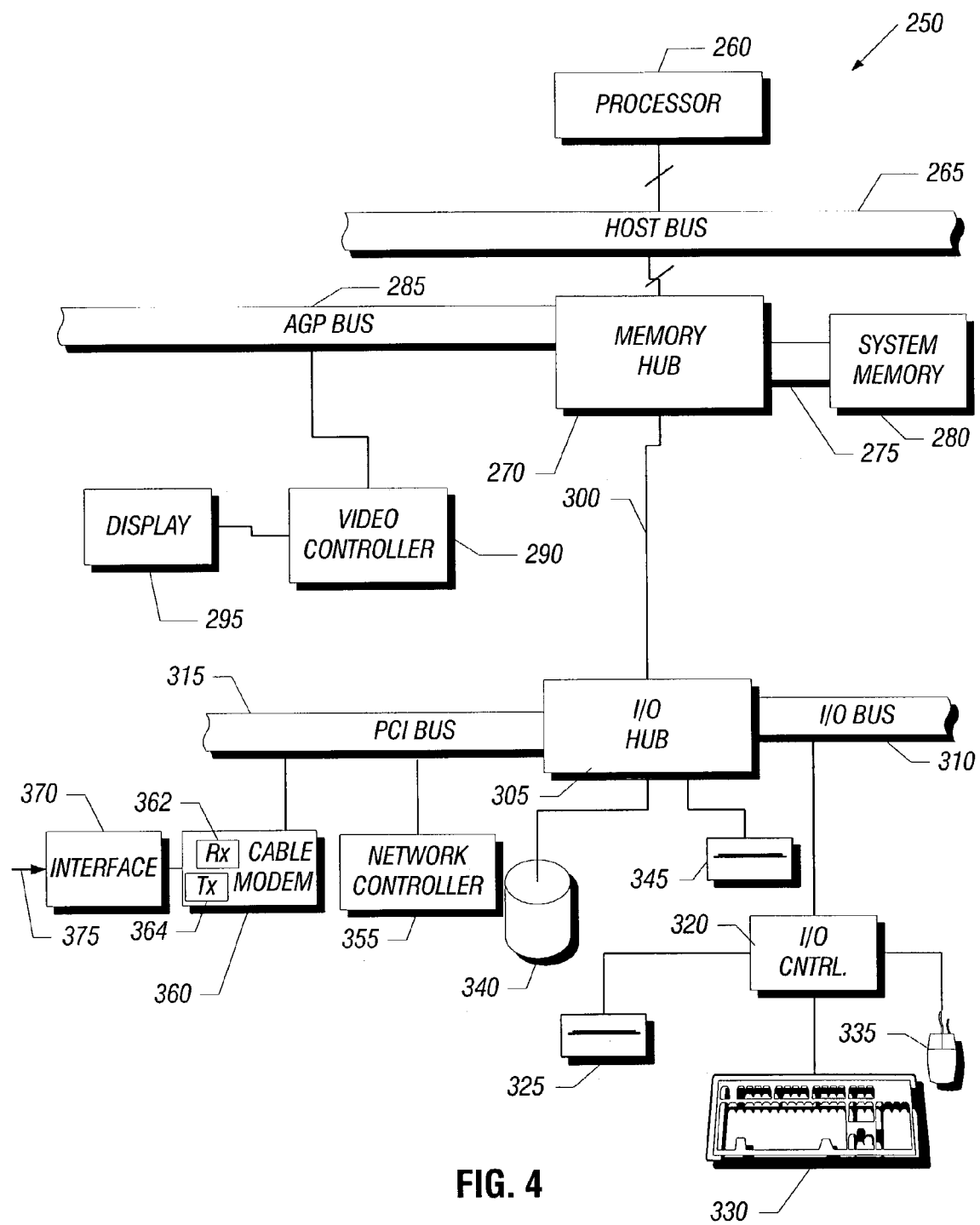
FIG. 4 shows a processor-based system including the receiver shown in FIG. 1 consistent with one embodiment of the present invention.

Referring to FIG. 4, a processor-based system 250 may include a processor 260 that is coupled to a host bus 265. In this context, the term "processor" may generally refer to one or more central processing units (CPUs), microcontrollers or microprocessors, as just a few examples. Furthermore, the processor-based system 250 may include a desktop computer, a laptop computer, a communication device, an appliance, or a set-top box, as just a few examples. Thus, the invention is not intended to be limited to the illustrated processor-based system 250 but rather, the processor-based system 250 is an example of one of many embodiments of the invention.

The host bus 265 may be coupled by a bridge, or a memory hub 270, to an Advanced Graphics Port (AGP) bus 285. The AGP is described in detail in the Accelerated Graphics Port Interface Specification, Revision 1.0, published in Jul. 31, 1996, by Intel Corporation of Santa Clara, Calif. The AGP bus 285 may be coupled to, for example, a video controller 290 that controls a display 295. The memory hub 270 may also couple the AGP bus 285 and the host bus 265 to a memory bus 275. The memory bus 275, in turn, may be coupled to a system memory 280 that may, as examples, store programs. The memory hub 270 may also be coupled (via a hub link 300) to another bridge, or input/output (I/O) hub 305, that is coupled to an I/O expansion bus 310 and the PCI bus 315. The I/O hub 305 may also be coupled to, as examples, a CD-ROM drive 345, and a hard disk drive 340. The I/O expansion bus 310 may be coupled to an I/O controller 320 that controls operation of a floppy disk drive 325 and receives input data from a keyboard 330 and a mouse 335, as examples.

Besides a network controller 355, a cable modem 360 may be coupled to the PCI bus 315. The cable modem 360 may comprise a receiver (Rx) 362, incorporating the receiver 5 depicted in FIG. 1 and a transmitter (Tx) 364 for communication over a network. The cable modem 360 may be coupled to an interface 370 to receive, over the network, broadband communication signals on a communication link 375, which may be a coaxial cable in one embodiment. However, other embodiments are within the scope of the present invention. For example, a communication device other than the cable modem 360 may implement the above-described techniques. Other network hardware and protocol stacks may be used in some embodiments without deviating form the scope of the present invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of filtering phase noise comprising:
    detecting the phase of a received symbol in the incoming signal;
    deriving a phase difference between the phase of the received symbol and a true phase of the current symbol;
    storing in order a history of the phase differences for the received symbols in the incoming signal including the phase differences before and after the decision point;
    storing the history of the phase differences for the received symbols in a first-in and first-out order;
    locating a symbol for the decision point at the middle of the first-in and first-out order; and
    estimating a phase shift for the symbol at the middle of the first-in and first-out order symmetrically based on an average of the phase differences stored before the decision point and an average of the phase differences stored after the decision point to obtain said another estimate of the phase shift.

2. The method of claim 1, comprising:
    symmetrically averaging the stored phase differences both before and after a symbol in the incoming signal at the decision point.

3. The method of claim 1, comprising:
    using said another estimate of the phase shift to correct for intersymbol interference and gain/phase rotation variations in the true phase of the current symbol.

4. The method of claim 3, comprising:
    adjusting an average of the phase difference between previously received symbols based on the corrected true phase of the current symbol to generate a first decision value to demodulate the incoming signal.

5. The method of claim 4, comprising:
    determining a second decision value corresponding to the first decision value to demodulate the incoming signal while reducing the phase noise therein.

6. A receiver comprising:
    an equalizer to estimate a phase shift in presence of the phase noise in an incoming signal of symbols having an associated phase;
    a phase detector to detect the phase of a received symbol in the incoming signal to derive a phase difference between the phase of the received symbol and a true phase of the current symbol; and
    a filter coupled to said equalizer to reduce the phase noise, said filter using a combination of symbol phase shift difference estimates prior and subsequent to a decision point for the received symbols in the incoming signal to derive another estimate of the phase shift relative to the estimated phase shift, said filter including an accumulator and a buffer pair coupled to said accumulator to store in order a history of the phase differences for the received symbols in the incoming signal including the phase differences before and after the decision point.

7. The receiver of claim 6, wherein said filter to estimate symmetrically average the stored phase differences both before and after a symbol in the incoming signal at the decision point.

8. The receiver of claim 6, wherein said filter to estimate the phase shift for the symbol at the middle of said buffer pair symmetrically based on an average of the phase differences stored before the decision point and an average of the phase differences stored after the decision point to obtain said another estimate of the phase shift.

9. The receiver of claim 8, wherein said filter to correct for intersymbol interference and gain/phase rotation variations in the true phase of the current symbol based on said another estimate of the phase shift.

10. The receiver of claim 9, wherein said receiver further comprising:
    a slicer to:
        adjust an average of the phase difference between previously received symbols based on the corrected true phase of the current symbol to generate a first decision value to demodulate the incoming signal; and
        determine a second decision value corresponding to the first decision value to demodulate the incoming signal while reducing the phase noise therein.

11. The receiver of claim 6 is a quadrature amplitude modulation receiver.

12. The receiver of claim 11, wherein the incoming signal to said quadrature amplitude modulation receiver is in a phase shift keying modulation format.

13. The receiver of claim 12, wherein said quadrature amplitude modulation receiver is located in a cable modem.

* * * * *